US012700738B2

(12) United States Patent
Druart

(10) Patent No.: US 12,700,738 B2
(45) Date of Patent: Aug. 4, 2026

(54) SYSTEMS AND METHODS FOR PROVIDING UNBALANCED CURRENT CONTROL IN ONBOARD VEHICLE BATTERY CHARGERS

(71) Applicant: BorgWarner US Technologies LLC, Wilmington, DE (US)

(72) Inventor: Sylvain Jean Francois Druart, Transinne (BE)

(73) Assignee: BorgWarner US Technologies LLC, Wilmington, DE (US)

( * ) Notice: Subject to any disclaimer, the term of this patent is extended or adjusted under 35 U.S.C. 154(b) by 676 days.

(21) Appl. No.: 18/325,394

(22) Filed: May 30, 2023

(65) Prior Publication Data

US 2024/0405590 A1     Dec. 5, 2024

(51) Int. Cl.
| | |
|---|---|
| *H01M 10/44* | (2006.01) |
| *B60L 53/14* | (2019.01) |
| *B60L 53/62* | (2019.01) |
| *H01M 10/46* | (2006.01) |
| *H02J 7/04* | (2006.01) |
| *H02J 7/94* | (2026.01) |
| *H02J 7/96* | (2026.01) |

(Continued)

(52) U.S. Cl.
CPC ................. *H02J 7/04* (2013.01); *B60L 53/14* (2019.02); *B60L 53/62* (2019.02); *H02J 7/94* (2026.01); *H02J 7/96* (2026.01); *B60L 55/00* (2019.02); *H02J 2105/37* (2026.01)

(58) Field of Classification Search
CPC ........ H02J 7/04; H02J 7/94; H02J 7/96; H02J 7/933; H02J 7/947; B60L 53/14; B60L 53/62; B60L 53/20

USPC ................ 320/104, 107, 109, 152, 157, 162
See application file for complete search history.

(56) References Cited

U.S. PATENT DOCUMENTS 9,590,483 B1 *  3/2017  Basic ................... H02M 1/088

FOREIGN PATENT DOCUMENTS

| | | | | |
|---|---|---|---|---|
| CN | 110146751 B | * | 11/2024 | ............. G01R 15/06 |
| CN | 118889474 A | * | 11/2024 | ................ H02J 3/32 |

(Continued)

OTHER PUBLICATIONS

Barrero-Gonzalez Fermin et al: "Control Strategy for Electric Vehicle Charging Station Power Converters with ActiveFunctions", Energies, vol. 12, No. 20, Oct. 18, 2019 (Oct. 18, 2019), p. 3971, XP093146056, CH ISSN: 1996-1073, DOI: 10.3390/en12203971.

(Continued)

*Primary Examiner* — Edward Tso
(74) *Attorney, Agent, or Firm* — Dickinson Wright PLLC

(57)     ABSTRACT
An apparatus includes a controller configured to: determine whether a first current measurement, a second current measurement, and a third current measurement are balanced; in response to a determination that the first current, the second current, and the third current are balanced, determine a weight factor; determine a product of a direct current voltage output measurement, the weight factor, a first sine reference, a second sine reference, and a third sine reference; generate a set of unbalanced current set points based on the product; and regulate the first current of the first current controller, the second current of the second current controller, and the third current of the third current controller using the set of unbalanced current set points.

20 Claims, 9 Drawing Sheets

200

(51) Int. Cl.
  *B60L 55/00* (2019.01)
  *H02J 105/37* (2026.01)

(56) References Cited

FOREIGN PATENT DOCUMENTS

EP      3782849 A2    2/2021
WO   2019129729 A1   7/2019

OTHER PUBLICATIONS

Bosheng Sun: How to Reduce Current Spikes at AC Zero-Crossing for Totem-Pole PFC, Analog Applications Journal, Texas Instruments, pp. 23-28.
Zhang et al: Four-Legged Three-Phase PFC Rectifier with Fault Toleratn Capability, GE Corporate Research & Development, Niskayuna, NY, 2000 IEEE, pp. 359-364.
Xin Guo: Optimized PI Controller Design for Three Phase PFC Converter Based on Multi-Objective Chaotic Particle Swarm Optimization, Journal of Power Electronics, vol. 16, No. 1, Jul. 2016, pp. 1-11.
Jiao et al: A Novel DROGI-Based Detection Scheme for Power Quality Improvement Using Four-Leg Converter Under Unbalanced Loads, IEEE Transactions on Industry Applications, vol. 56, No. 1, Jan./Feb. 2020, pp. 815-825.
Wang Hui: Control Method of Three-Phase Four-Leg Converter Based on Repetitive Control, IOP Conf. Series: Materials Science and Engineering 339 (2018), ICMES 2017, IOP Publishing, 9 pgs.
Wang et al: Pliant Active and Reactive Power Control for Grid-Interactive Converters Under Unbalanced Voltage Dips, IEEE Transactions of Power Electronics, Jun. 2011, 12 pgs.

* cited by examiner

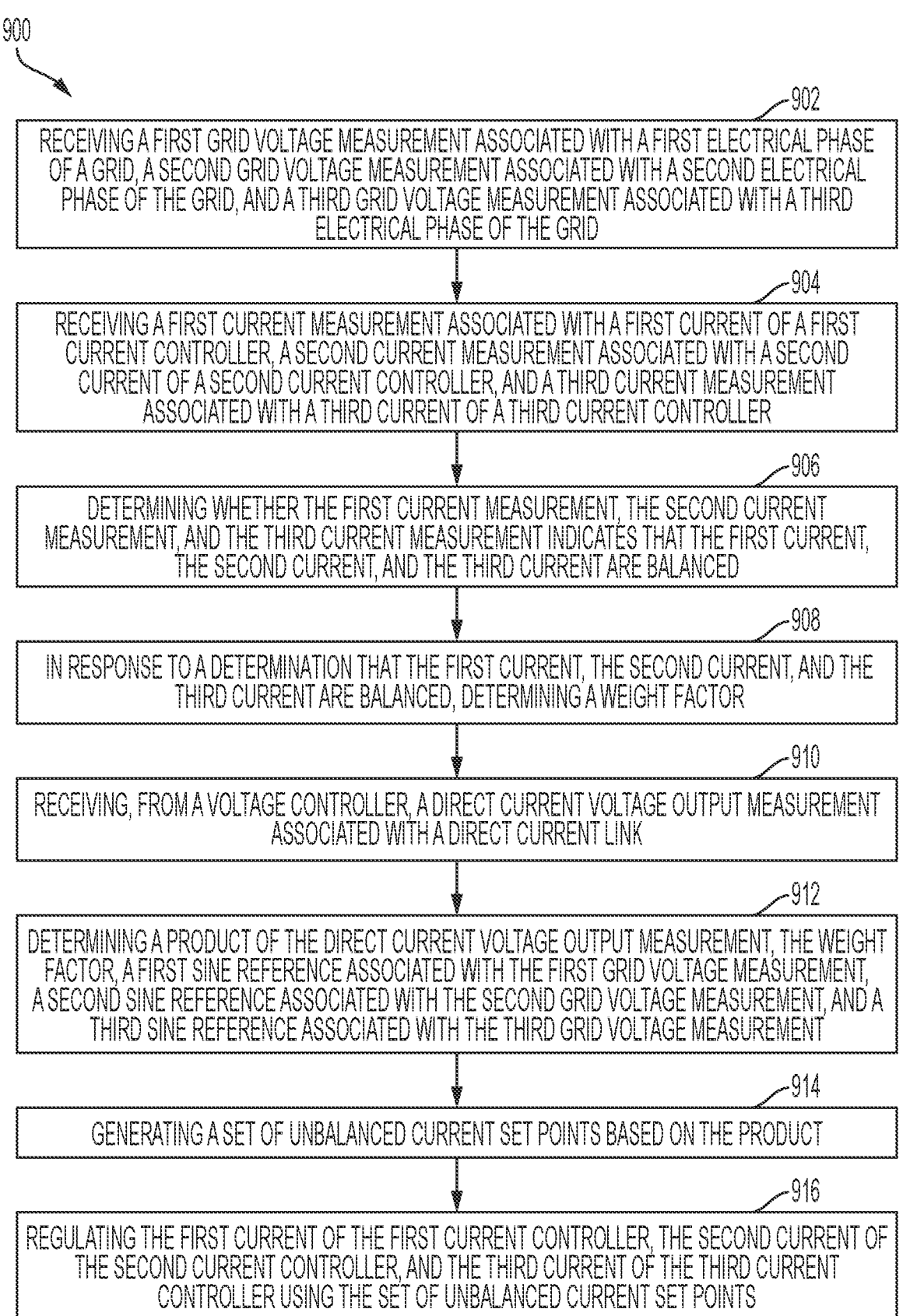

900

902
RECEIVING A FIRST GRID VOLTAGE MEASUREMENT ASSOCIATED WITH A FIRST ELECTRICAL PHASE OF A GRID, A SECOND GRID VOLTAGE MEASUREMENT ASSOCIATED WITH A SECOND ELECTRICAL PHASE OF THE GRID, AND A THIRD GRID VOLTAGE MEASUREMENT ASSOCIATED WITH A THIRD ELECTRICAL PHASE OF THE GRID

904
RECEIVING A FIRST CURRENT MEASUREMENT ASSOCIATED WITH A FIRST CURRENT OF A FIRST CURRENT CONTROLLER, A SECOND CURRENT MEASUREMENT ASSOCIATED WITH A SECOND CURRENT OF A SECOND CURRENT CONTROLLER, AND A THIRD CURRENT MEASUREMENT ASSOCIATED WITH A THIRD CURRENT OF A THIRD CURRENT CONTROLLER

906
DETERMINING WHETHER THE FIRST CURRENT MEASUREMENT, THE SECOND CURRENT MEASUREMENT, AND THE THIRD CURRENT MEASUREMENT INDICATES THAT THE FIRST CURRENT, THE SECOND CURRENT, AND THE THIRD CURRENT ARE BALANCED

908
IN RESPONSE TO A DETERMINATION THAT THE FIRST CURRENT, THE SECOND CURRENT, AND THE THIRD CURRENT ARE BALANCED, DETERMINING A WEIGHT FACTOR

910
RECEIVING, FROM A VOLTAGE CONTROLLER, A DIRECT CURRENT VOLTAGE OUTPUT MEASUREMENT ASSOCIATED WITH A DIRECT CURRENT LINK

912
DETERMINING A PRODUCT OF THE DIRECT CURRENT VOLTAGE OUTPUT MEASUREMENT, THE WEIGHT FACTOR, A FIRST SINE REFERENCE ASSOCIATED WITH THE FIRST GRID VOLTAGE MEASUREMENT, A SECOND SINE REFERENCE ASSOCIATED WITH THE SECOND GRID VOLTAGE MEASUREMENT, AND A THIRD SINE REFERENCE ASSOCIATED WITH THE THIRD GRID VOLTAGE MEASUREMENT

914
GENERATING A SET OF UNBALANCED CURRENT SET POINTS BASED ON THE PRODUCT

916
REGULATING THE FIRST CURRENT OF THE FIRST CURRENT CONTROLLER, THE SECOND CURRENT OF THE SECOND CURRENT CONTROLLER, AND THE THIRD CURRENT OF THE THIRD CURRENT CONTROLLER USING THE SET OF UNBALANCED CURRENT SET POINTS

FIG. 9

SYSTEMS AND METHODS FOR PROVIDING UNBALANCED CURRENT CONTROL IN ONBOARD VEHICLE BATTERY CHARGERS

TECHNICAL FIELD

This disclosure relates to battery chargers, and in particular, systems and methods for providing unbalanced current control in onboard vehicle battery chargers.

BACKGROUND

Vehicles, such as cars, trucks, sport utility vehicles, crossovers, mini-vans, or other suitable vehicles, typically include various electric components, such as motors (e.g., permanent magnet motors or other suitable electric motors), batteries, battery chargers, and the like. Such electric components may be used for various aspects of vehicle control or operation, such as vehicle prolusion or other suitable aspects of vehicle control or operation.

SUMMARY

This disclosure relates generally to vehicle onboard battery chargers.

An aspect of the disclosed embodiments includes a system for providing unbalanced current control. The system includes a processor, and a memory. The memory includes instructions that, when executed by the processor, cause the processor to: receive a first grid voltage measurement associated with a first electrical phase of a grid, a second grid voltage measurement associated with a second electrical phase of the grid, and a third grid voltage measurement associated with a third electrical phase of the grid; receive a first current measurement associated with a first current of a first current controller, a second current measurement associated with a second current of a second current controller, and a third current measurement associated with a third current of a third current controller; determine whether the first current measurement, the second current measurement, and the third current measurement indicates that the first current, the second current, and the third current are balanced; in response to a determination that the first current, the second current, and the third current are balanced, determine a weight factor; receive, from a voltage controller, a direct current voltage output measurement associated with a direct current link; determine a product of the direct current voltage output measurement, the weight factor, a first sine reference associated with the first grid voltage measurement, a second sine reference associated with the second grid voltage measurement, and a third sine reference associated with the third grid voltage measurement; generate a set of unbalanced current set points based on the product; and regulate the first current of the first current controller, the second current of the second current controller, and the third current of the third current controller using the set of unbalanced current set points.

Another aspect of the disclosed embodiments includes a method for providing unbalanced current control. The method includes: receiving a first grid voltage measurement associated with a first electrical phase of a grid, a second grid voltage measurement associated with a second electrical phase of the grid, and a third grid voltage measurement associated with a third electrical phase of the grid; receiving a first current measurement associated with a first current of a first current controller, a second current measurement associated with a second current controller, and a third current measurement associated with a third current of a third current controller; determining whether the first current measurement, the second current measurement, and the third current measurement indicates that the first current, the second current, and the third current are balanced; in response to a determination that the first current, the second current, and the third current are balanced, determining a weight factor; receiving, from a voltage controller, a direct current voltage output measurement associated with a direct current link; determining a product of the direct current voltage output measurement, the weight factor, a first sine reference associated with the first grid voltage measurement, a second sine reference associated with the second grid voltage measurement, and a third sine reference associated with the third grid voltage measurement; generating a set of unbalanced current set points based on the product; and regulating the first current of the first current controller, the second current of the second current controller, and the third current of the third current controller using the set of unbalanced current set points.

Another aspect of the disclosed embodiments includes an apparatus for providing unbalanced current control. The apparatus includes a controller configured to: determine whether a first current measurement associated with a first current of a first current controller, a second current measurement associated with a second current of a second current controller, and a third current measurement associated with a third current of a third current controller are balanced; in response to a determination that the first current, the second current, and the third current are balanced, determine a weight factor; determine a product of a direct current voltage output measurement associated with a direct current link, the weight factor, a first sine reference associated with a first grid voltage measurement associated with a first electrical phase of a grid, a second sine reference associated with a second grid voltage measurement associated with a second electrical phase of the grid, and a third sine reference associated with a third grid voltage measurement associated with a third electrical phase of the grid; generate a set of unbalanced current set points based on the product; and regulate the first current of the first current controller, the second current of the second current controller, and the third current of the third current controller using the set of unbalanced current set points.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 9 generally illustrates an unbalanced current control method according to the principles of the present disclosure.

DETAILED DESCRIPTION

Figure 1:
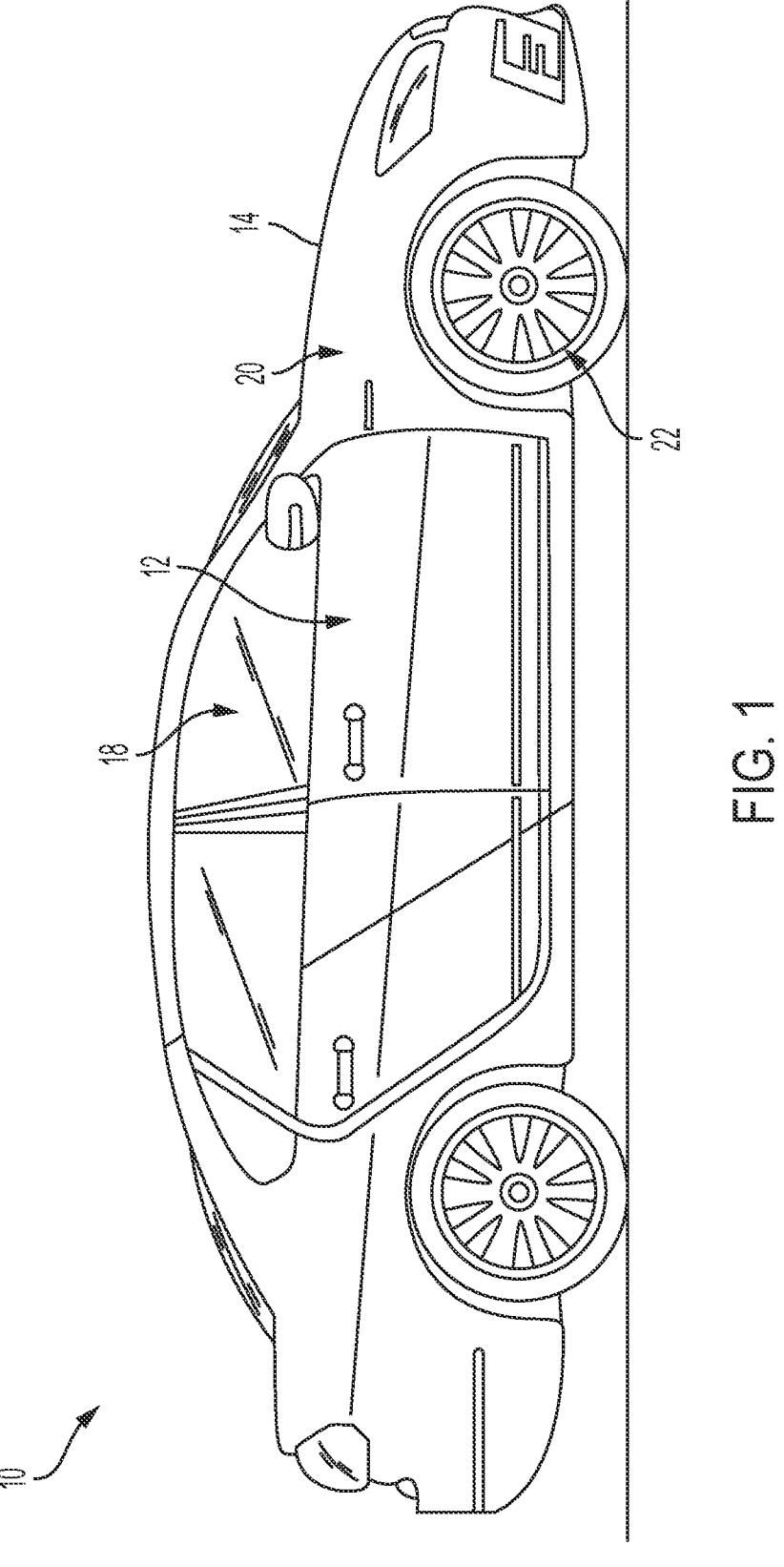
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, cross-overs, mini-vans, or other suitable vehicles, typically include various electric components, such as motors (e.g., permanent magnet motors or other suitable electric motors), batteries, battery chargers, and the like. Such electric components may be used for various aspects of vehicle control or operation, such as vehicle prolusion or other suitable aspects of vehicle control or operation.

Such vehicles may include electric vehicles (EV), which are becoming more popular (e.g., due to increased fuel costs and more strict standards for fuel emissions). Such EVs may use a variety of batteries, including high voltage batteries, to propel the EV and/or provide power to various electrical components of the EV. Other applications for using vehicle batteries are emerging, such as energy storage and backup generators. The on-board charger (OBC) has a dual purpose: (i) to provide a bidirectional system that converts alternating current (AC) voltage to direct current (DC) voltage in charging mode and (ii) to convert DC to AC in discharge or inverter mode. Typically, charge mode is used to convert power from an electrical grid (e.g., AC power) into DC voltage to charge the vehicle high voltage (HV) battery and in discharge or inverter mode converters the HV battery DC voltage into AC voltage that may be provided back to the grid, be supplied as a back generator to power electrical components of a house or other suitable electrical components when the grid is down, and/or as an inverter to supply voltage to vehicle AC outlets.

Typically, the OBC may include an AC/DC circuit (e.g., which may include a power factor correction (PFC) circuit). The AC/DC circuit may operate in a three-phase grid supply mode. A typical architecture for such a circuit may include a totem-pole topology. This architecture works like a boost switched converter, with may include one or more (e.g., typically three) input boost inductors (e.g., L1, L2, L3) that charge an output capacitances CDC in order to supply a load RL. High-speed legs my act as fast commanded pulse-width-modulation (PWM) boost switches. This architecture may also include a single phase used to flip the neutral reference regarding the input AC voltage cycle, which may be switched off in three-phase AC grid mode.

An electro-magnetic interference (EMI) low-pass filter (LPF) filter stage may be used to filter common and differential mode noises that impact the inductor currents IL, IL2, IL3. Additionally, a phase-locked loop (PLL) circuit may be used to filter the 3 AC voltage phase measurements in order to generate a clean rotating angle that may be used to control Park transforms. A DC output link voltage $V_{DC}$ may be controlled against a given voltage set point $V_{DC,set}$, and a proportional-integral-derivative (PID) voltage controller output may be used as the current set point for PI current controllers.

Typically, the current measurements IL, IL2, IL3 are transformed into two virtual DC components ID and IQ which are used as feedback for the current controllers, where ID is controlled against the voltage controller output and IQ is controlled against 0. The output of the current controllers are then reverted into AC using a Park inverse transform, which eventually provides the final duty cycle analog values. The analog duty cycles values are then converted to PWM signals using the PWM modulator (e.g., implemented by silicon microcontroller timers).

An alternative architecture concept may include the addition of a boost inductor on the neutral path. The fourth leg, which was previously used for single phase slow speed switching, is now fully controllable in PWM operation mode.

However, such topologies may not be suitable for unbalanced current control, may not be suitable for control of unbalanced three-phase AC grid currents in a charging mode does not seem often discussed, and/or may lack bidirectional capabilities.

Accordingly, systems and methods, such as those described herein, configured to provide unbalanced current control, may be desirable. In some embodiments, the systems and methods described herein may be configured to provide a control topology in charging mode using weighted current set point lines. The systems and methods described herein may be configured to use an automatic duty cycle feedforward gain controller configured to provide an optimum power factor (e.g., optimum efficiency, minimum DC).

In some embodiments, the systems and methods described herein may be configured to provide an architecture that is bidirectional capable and/or extendable to n-phases (e.g., extendable to any suitable type of network, such as single phase network, a split phase network (180 degree shifted AC voltage), a three phase network (120 degree shifted AC voltages) a four phase network (90 degrees shifted AC voltages) and/or an N phase network (360/N degrees shifted AC voltages)).

In some embodiments, the systems and methods described herein may be configured to receive a first grid voltage measurement associated with a first electrical phase of a grid, a second grid voltage measurement associated with a second electrical phase of the grid, and a third grid voltage measurement associated with a third electrical phase of the grid. The systems and methods described herein may be configured to receive a first current measurement associated with a first current of a first current controller, a second current measurement associated with a second current of a second current controller, and a third current measurement associated with a third current of a third current controller.

The systems and methods described herein may be configured to determine whether the first current measurement, the second current measurement, and the third current measurement indicates that the first current, the second current, and the third current are balanced. The systems and methods described herein may be configured to, in response to a determination that the first current, the second current, and the third current are balanced, determine a weight factor. The weight factor may include an array of values. The array of values may include a first value corresponding to the first current controller, a second value corresponding to the second current controller, and a third value corresponding to the third current controller. In some embodiments, the weight factor may be provided by a user at a user interface. The user may selectively tune the weight factor to create an unbalanced current situation. Additionally, or alternatively, determining the weight factor may include receiving the weight factor from the user via the user interface, retrieving the weight factor from a memory location where the weight factor is stored, and/or determining the weight factor using any suitable technique (e.g., which may include generating the weight factor).

The systems and methods described herein may be configured to receive, from a voltage controller, a direct current voltage output measurement associated with a direct current link. The voltage controller may be associated with vehicle battery charger. The voltage controller may regulate a direct current voltage output associated with the direct current voltage output measurement using a predetermined voltage set point.

The systems and methods described herein may be configured to determine a product of the direct current voltage output measurement, the weight factor, a first sine reference associated with the first grid voltage measurement, a second sine reference associated with the second grid voltage measurement, and a third sine reference associated with the third grid voltage measurement. The first sine reference, the second sine reference, and the third sine reference may be generated by a PLL circuit. The PLL circuit may generate the first sine reference, the second sine reference, and the third sine reference based on the first grid voltage measurement, the second grid voltage measurement, and the third grid voltage measurement.

The systems and methods described herein may be configured to generate a set of unbalanced current set points based on the product. The systems and methods described herein may be configured to regulate the first current of the first current controller, the second current of the second current controller, and the third current of the third current controller using the set of unbalanced current set points.

In some embodiments, the systems and methods described herein may be configured to determine a sum of the first current measurement, the second current measurement, and the third current measurement. The systems and methods described herein may be configured to provide the sum at a fourth current controller. The systems and methods described herein may be configured to generate a duty cycle based on outputs of the first current controller, the second current controller, the third current controller, and the fourth current controller. The systems and methods described herein may be configured to apply the duty cycle to the voltage controller. The systems and methods described herein may be configured to apply a feedforward gain to the first current controller, the second current controller, and the third current controller.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles which turns wheels 22. When the vehicle 10 includes one or more electric motors, a vehicle battery and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
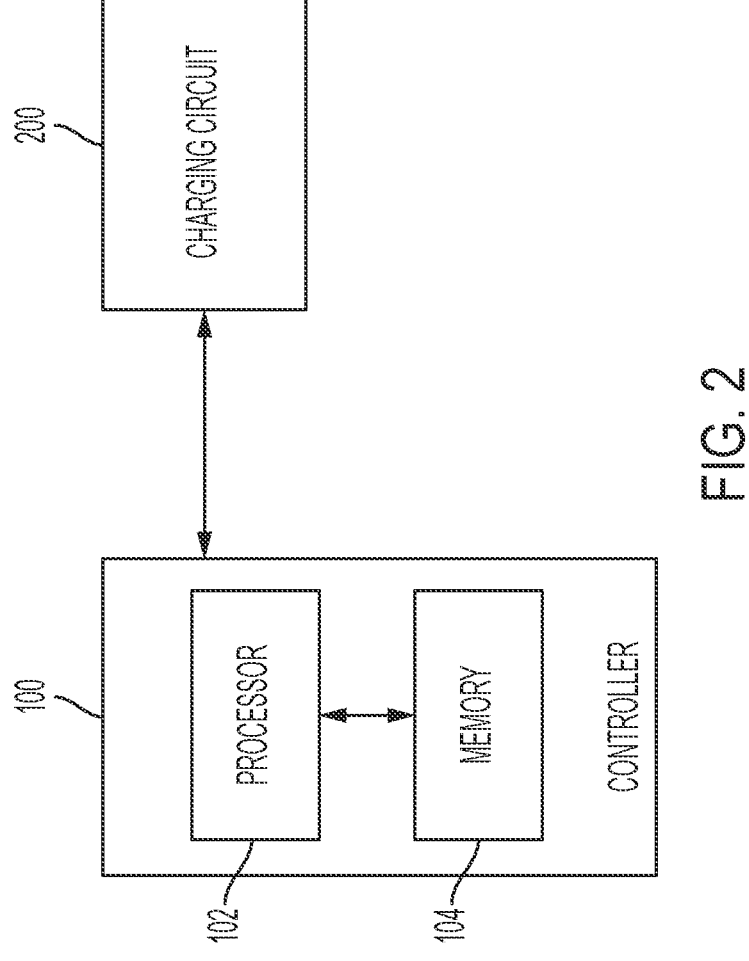
FIG. 2 generally illustrates a controller according to the principles of the present disclosure.
Figure 3:
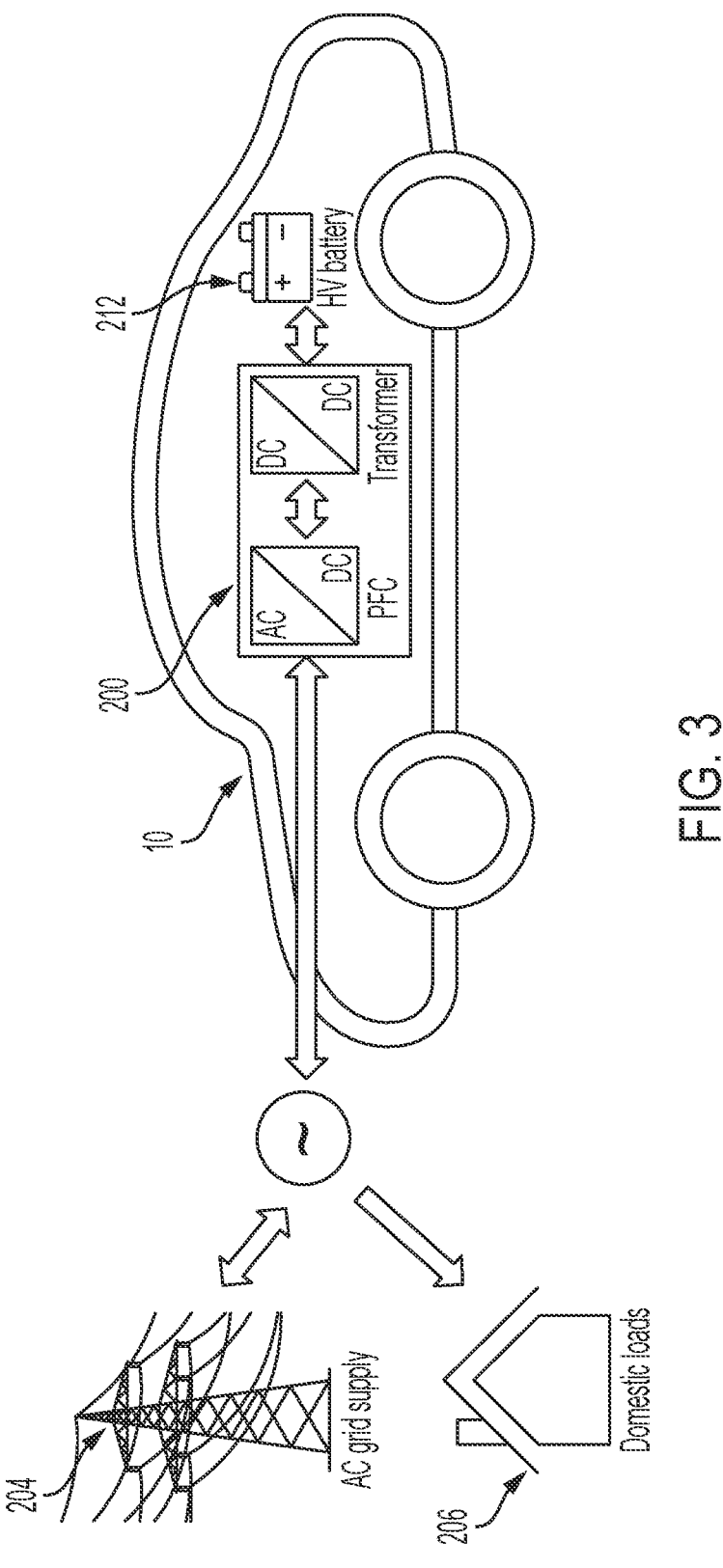
FIG. 3 generally illustrates a vehicle charging and/or discharging network according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10 and/or perform various aspects of the systems and methods described herein.

The controller 100 may be in communication with a charging circuit 200. With reference to FIGS. 3-8, the charging circuit 200 may be configured to charge at least one high voltage (HV) battery of the vehicle 10, such as the HV battery 212. The charging circuit 200 may include a power factor correction (PFC) circuit and a transformer circuit electrically connected to a power source, such as an AC electrical grid 204 and/or home power source 206. The circuit 200 (e.g., which may be referred to as an OBC) may be configured to transfer energy from the grid 204 to HV battery 212 (e.g., which may include any suitable capacity such as 400 volts, 900 volts, and/or the like).

Figure 4:
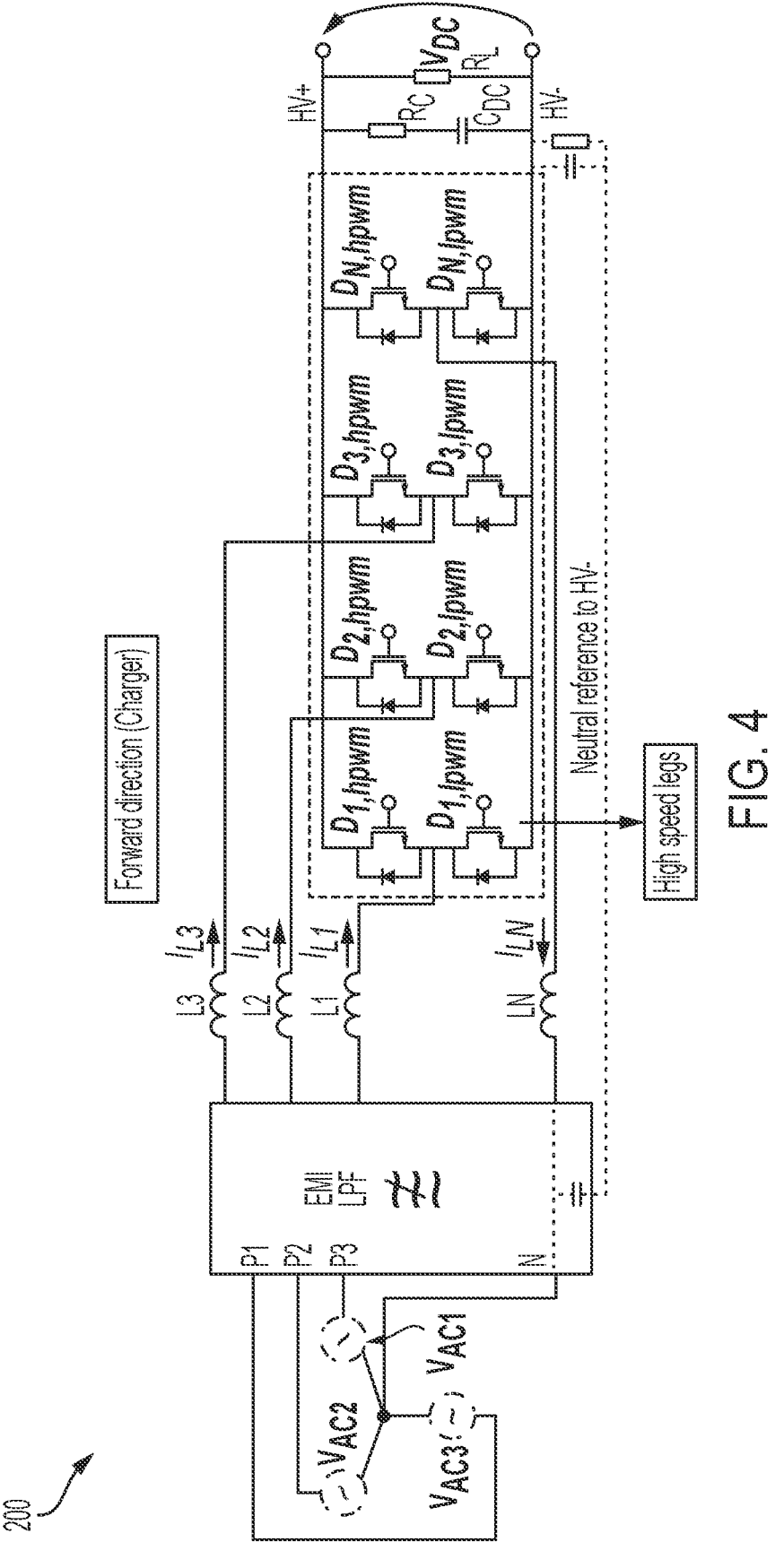
FIGS. 4-6 generally illustrate a charging circuit according to the principles of the present disclosure.
Figure 5:
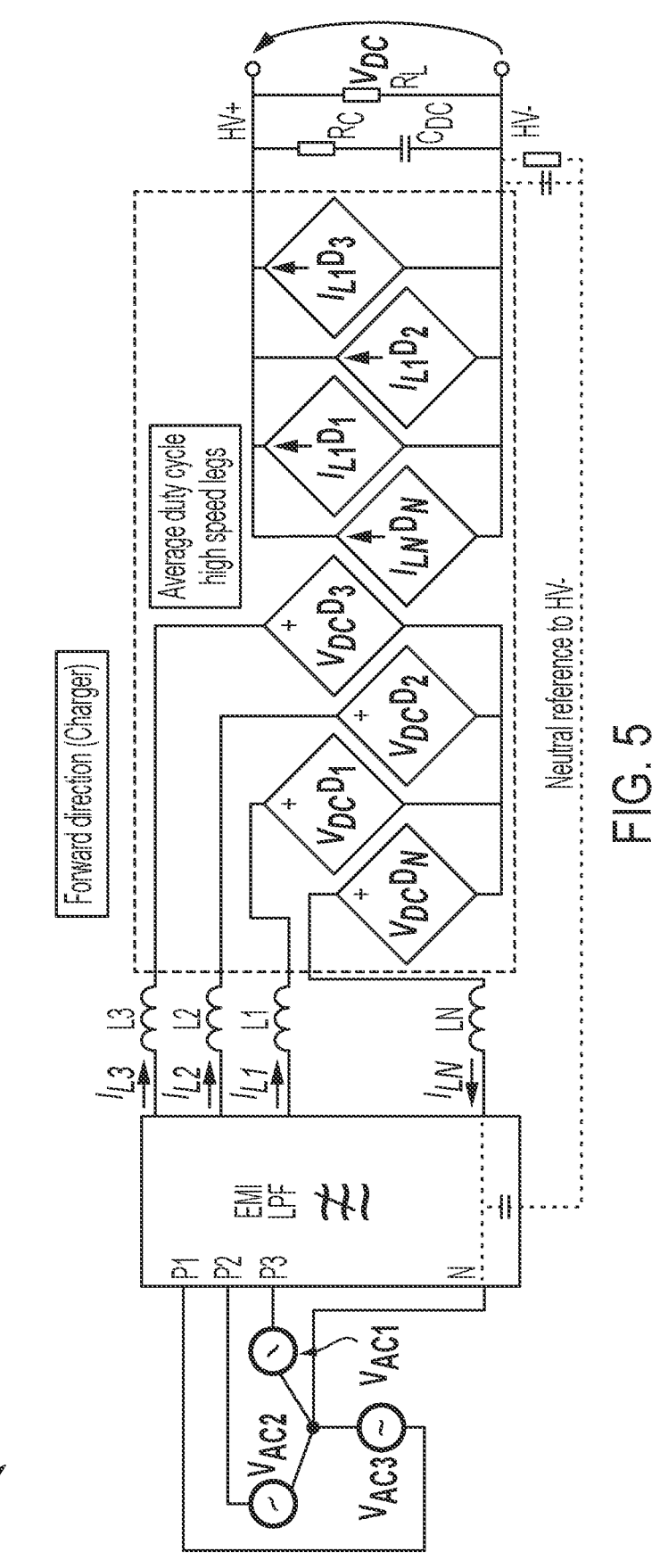

With reference to FIG. 4, the circuit 200 may include a four leg inventor configuration. A source voltage may include a DC source voltage and the load may include an AC load. The load may not be balanced and may not connected to AC voltage of the grid 204, which may mean that that the regulation generates the AC voltage. The circuit 200 may include a vehicle to load (V2L) configuration. As is generally illustrated in FIG. 5, the circuit 200 may include an equivalent theoretical average model for regulation of coefficients tuning.

Figure 6:
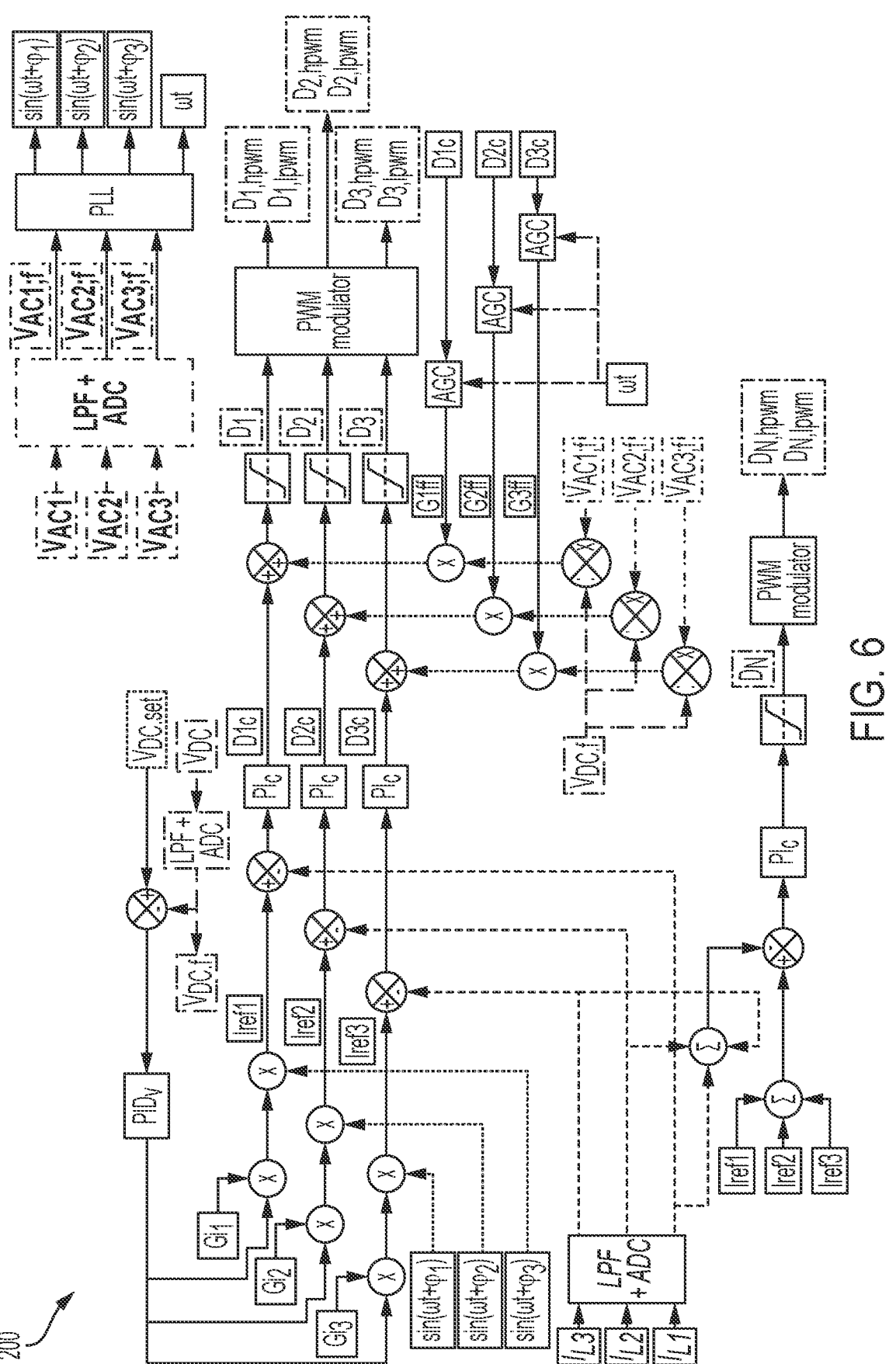

In some embodiments, the controller 100 may tune the DC voltage set point $V_{DC,set}$ and/or the weight factors $G_{ix}$ external to the circuit 200 via the CAN bus. The controller 100 may receive Vac1, Vac2, Vac3 (e.g., the grid 204 phase voltages) and IL1, IL2, IL3 (e.g., the phase inductor currents). The controller 100 may also receive $V_{DC}$ (e.g., the DC link output voltage). In some embodiments, the controller 100 may perform the calculations and/or other steps described herein at a computing cycle rate. The computing cycle rate may include any suitable rate, such as 10 microseconds or other suitable rate. At every computing cycle rate, the controller 100 may refresh the duty cycle and convert the duty cycle into a PWM signal (e.g., using the PWM modulator). Referring now to FIG. 6, the circuit 200 may allow for controlling unbalanced phase grid 204 current amplitudes. A fourth control branch may be used in order to retrieve the unbalanced resulting current into the neutral path.

The circuit 200 may include a PLL to generate filtered and cleaned three-phase sine references and a rotating angle. The PLL may generate the sine references from AC grid voltage measurements of voltage from the grid 204 and/or filtering. The circuit 200 may include a voltage controller configured to control the DC link output voltage $V_{DC}$ against a given set point $V_{DC,set}$. The output of the voltage controller feeds three paths that are each multiplied by a weighting factor and PLL sine references to create the unbalanced current sine set points for the current controllers. Three measured currents, IL, IL2, IL3, feed the current controllers and are regulated against the unbalanced current set points.

The controller 100 may sum the current controller outputs with an automatic gain controlled (AGC) feedforward function that makes the PI controller work at a reduced to limited rate, which may avoid high compensation work from the current controllers and thus a poor correction of the final power factor. The controller 100 may measure the DC link output voltage and may use the measured voltage as feedback for the voltage controller $P_{iv}$. The controller 100 may apply or use a voltage set point $V_{DC,set}$ (e.g., having any suitable value, such as 750 volts or other suitable value) as voltage regulation point.

The controller 100 may multiply the voltage controller output with a weight factor $G_{ix}$ (e.g., where x represents the phase index) and by sine references $\sin_{(wt+phix)}$ (e.g., where w is the 2*pi*(50 Hz) grid frequency (European) and $\sigma_x$ are the phase shift (e.g., [0,120,240] degree of the three-phase grid 204).

The controller 100 may use the weight factors $G_{ix}$ to create an unbalanced current situation in the three different phases. For example, if $G_i$=[0.5, 1, 1], phase 1 carries the half of the current of the two other phases, while the neutral phase carries the remaining current. Additionally, or alternatively, if $G_i$=[1, 1, 1], the phases are in a balanced situation, and the neutral current is equal to 0.

The PLL may provide the sine references $\sin_{(wt+phix)}$. The PLL may be configured to filter and smooth the AC grid measured voltages. The set points of the three phase current controllers are thus the result of the output voltage controller with the sine references and the weight factors. The controller 100 may provide the currents feedbacks to the current controllers to give the error terms for current regulation.

In some embodiments, a fourth current controller may collect the sums of phase current set points to get the neutral current set point. The neutral current controller feedback may include the sum of the three phase current measurements. This forms the neutral leg duty cycles, which the controller 100 may apply at least one neutral leg metal-oxide-semiconductor field-effect transistor (MOSFET). The controller 100 may add, to the three phase current controller outputs, a feedforward term multiplied by a specific gain $G_{ffx}$ in order to reduce the workload of the three current controllers Pic. The controller 100 may calculate the feedforward gains $G_{ffx}$ are to be optimum, (e.g., such that each current controller workload will be at a minimum), which may allow a current controller to act as an integral controller with calibratable gain $K_{age}$.

Figure 7:
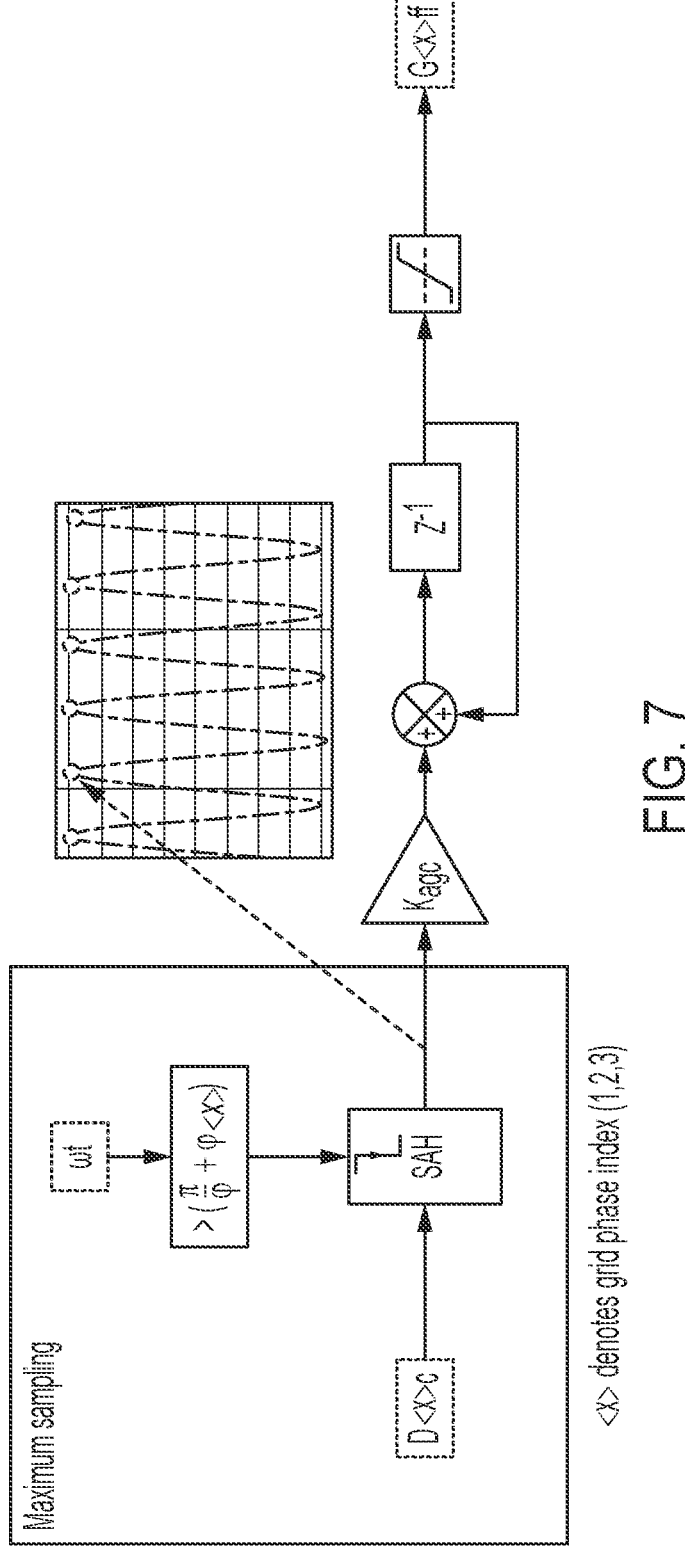
FIG. 7 generally illustrates an automatic gain controlled feedforward function according to the principles of the present disclosure.

With reference to FIG. 7, the AGC feedforward function is generally illustrated. The controller 100 may calculate the feedforward gains following a sample and hold principle of a current controller output $D_{cx}$, where a snapshot is taken at every maximum. The controller 100 may use an output rotating angle $\omega_t$ (e.g., provided by the PLL) as a synchronous reference to take the snapshot of $D_{cx}$ at the maximum. The controller 100 may shift the rotating angle relative to the phase of the power line. The controller 100 may sample the maximum phase duty cycles according to respective phase angles $\sigma_x$ (e.g. [0, 120, 240] degrees or other suitable angle(s)). The controller 100 may control the maximum for each phase using an integral control scheme. The controller 100 may determine the applied final duty cycle using a sum of the feedforward term and the outputs of the current controllers. The circuit 200 may include a PWM modulator that forms the PWM applied to switching MOSFETs associated with the first phase, the second phase, and the third phase of the circuit 200. The controller 100 may output the regulated feedforward gain.

Figure 8:
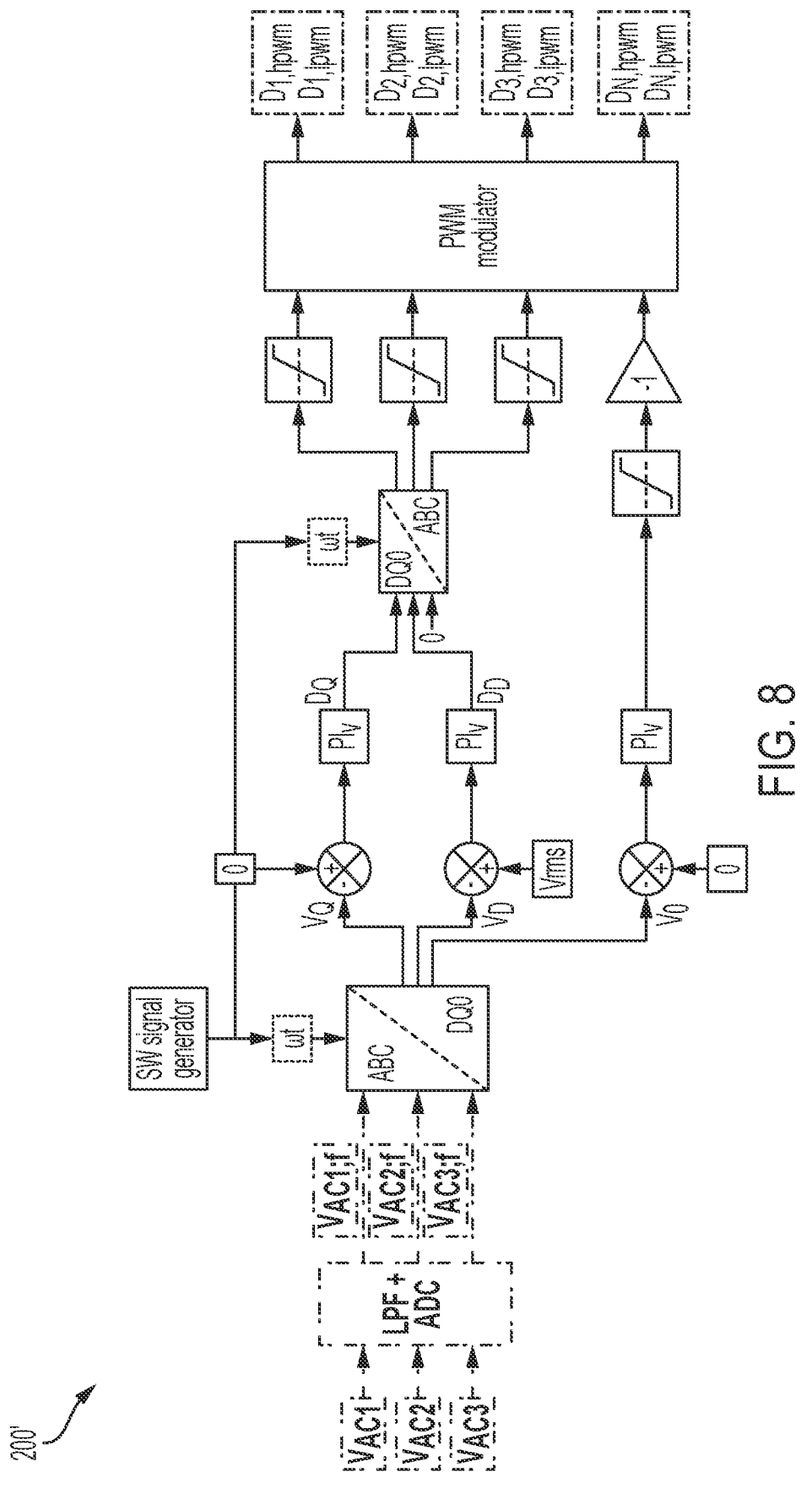
FIG. 8 generally illustrates an inverting circuit according to the principles of the present disclosure.

FIG. 8 generally illustrates an inverting circuit 200' configure to provide a regulation loop for a four leg inverter. The circuit 200' may include similar and/or different features from the circuit 200. The circuit 200' may be configured to regulate voltage (e.g., the absence of current regulation is justified by the unpredictability of the AC load). The circuit 200' may be configured to revert the four leg topology to operate in a desired more (e.g., charging, inverting, and the like).

In some embodiments, the controller 100 may receive a first grid voltage measurement (e.g., Vac1) associated with a first electrical phase of the grid 204, a second grid voltage measurement (e.g., Vac2) associated with a second electrical phase of the grid 204, and a third grid voltage measurement (e.g., Vac3) associated with a third electrical phase of the grid 204. The controller 100 may receive a first current measurement (e.g., IL1) associated with a first current of a first current controller, a second current measurement (e.g., IL2) associated with a second current of a second current controller, and a third current measurement (e.g., IL3) associated with a third current of a third current controller.

The controller 100 may determine whether the first current measurement, the second current measurement, and the third current measurement indicates that the first current, the second current, and the third current are balanced. The controller 100 may, in response to a determination that the first current, the second current, and the third current are balanced, determine a weight factor. The weight factor may include an array of values. The array of values may include a first value corresponding to the first current controller, a second value corresponding to the second current controller, and a third value corresponding to the third current controller.

The controller 100 may receive, from a voltage controller, a direct current voltage output (e.g., $V_{DC}$) measurement associated with a direct current link. The voltage controller may regulate a direct current voltage output associated with the direct current voltage output measurement using a predetermined voltage set point.

The controller 100 may determine a product of the direct current voltage output measurement, the weight factor, a first sine reference associated with the first grid voltage measurement, a second sine reference associated with the second grid voltage measurement, and a third sine reference associated with the third grid voltage measurement. The first sine reference, the second sine reference, and the third sine reference may be generated by the PLL circuit. The PLL circuit may generate the first sine reference, the second sine reference, and the third sine reference based on the first grid voltage measurement, the second grid voltage measurement, and the third grid voltage measurement.

The controller 100 may generate a set of unbalanced current set points based on the product. The controller 100 may regulate the first current of the first current controller, the second current of the second current controller, and the third current of the third current controller using the set of unbalanced current set points.

In some embodiments, controller 100 may determine a sum of the first current measurement, the second current measurement, and the third current measurement. The controller 100 may provide the sum at a fourth current controller. The controller 100 may generate a duty cycle based on outputs of the first current controller, the second current controller, the third current controller, and the fourth current controller. The controller 100 may apply the duty cycle to the voltage controller. The controller 100 may apply a feedforward gain to the first current controller, the second current controller, and the third current controller.

In some embodiments, the controller 100 may perform the methods described herein. However, the methods described herein as performed by the controller 100 are not meant to be limiting, and any type of software executed on a controller can perform the methods described herein without departing from the scope of this disclosure. For example, a controller, such as a processor executing software within a computing device onboard the vehicle 10, can perform the methods described herein.

FIG. 9 is a flow diagram generally illustrating an unbalanced current control method 900 according to the principles of the present disclosure. At 902, the method 900 receives a first grid voltage measurement associated with a first electrical phase of a grid, a second grid voltage measurement associated with a second electrical phase of the grid, and a third grid voltage measurement associated with a third electrical phase of the grid.

At 904, the method 900 receives a first current measurement associated with a first current of a first current controller, a second current measurement associated with a second current of a second current controller, and a third current measurement associated with a third current of a third current controller.

At 906, the method 900 determines whether the first current measurement, the second current measurement, and the third current measurement indicates that the first current, the second current, and the third current are balanced.

At 908, the method 900, in response to a determination that the first current, the second current, and the third current are balanced, determines a weight factor.

At 910, the method 900 receives, from a voltage controller, a direct current voltage output measurement associated with a direct current link.

At 912, the method 900 determines a product of the direct current voltage output measurement, the weight factor, a first sine reference associated with the first grid voltage measurement, a second sine reference associated with the second grid voltage measurement, and a third sine reference associated with the third grid voltage measurement.

At 914, the method 900 generates a set of unbalanced current set points based on the product.

At 916, the method 900 regulates the first current of the first current controller, the second current of the second current controller, and the third current of the third current controller using the set of unbalanced current set points.

In some embodiments, a system for providing unbalanced current control includes a processor, and a memory. The memory includes instructions that, when executed by the processor, cause the processor to: receive a first grid voltage measurement associated with a first electrical phase of a grid, a second grid voltage measurement associated with a second electrical phase of the grid, and a third grid voltage measurement associated with a third electrical phase of the grid; receive a first current measurement associated with a first current of a first current controller, a second current measurement associated with a second current of a second current controller, and a third current measurement associated with a third current of a third current controller; determine whether the first current measurement, the second current measurement, and the third current measurement indicates that the first current, the second current, and the third current are balanced; in response to a determination that the first current, the second current, and the third current are balanced, determine a weight factor; receive, from a voltage controller, a direct current voltage output measurement associated with a direct current link; determine a product of the direct current voltage output measurement, the weight factor, a first sine reference associated with the first grid voltage measurement, a second sine reference associated with the second grid voltage measurement, and a third sine reference associated with the third grid voltage measurement; generate a set of unbalanced current set points based on the product; and regulate the first current of the first current controller, the second current of the second current controller, and the third current of the third current controller using the set of unbalanced current set points.

In some embodiments, the instructions further cause the processor to determine a sum of the first current measurement, the second current measurement, and the third current measurement. In some embodiments, the instructions further cause the processor to provide the sum at a fourth current controller. In some embodiments, the instructions further cause the processor to generate a duty cycle based on outputs of the first current controller, the second current controller, the third current controller, and the fourth current controller. In some embodiments, the instructions further cause the processor to apply the duty cycle to the voltage controller. In some embodiments, the instructions further cause the processor to apply a feedforward gain to the first current controller, the second current controller, and the third current controller. In some embodiments, the voltage controller is associated with vehicle battery charger. In some embodiments, the weight factor includes an array of values. In some embodiments, the array of values includes a first value corresponding to the first current controller, a second value corresponding to the second current controller, and a third value corresponding to the third current controller. In some embodiments, the first sine reference, the second sine reference, and the third sine reference are generated by a phase-locked loop circuit. In some embodiments, the phase-locked loop circuit generates the first sine reference, the second sine reference, and the third sine reference based on the first grid voltage measurement, the second grid voltage measurement, and the third grid voltage measurement. In some embodiments, the voltage controller regulates a direct current voltage output associated with the direct current voltage output measurement using a predetermined voltage set point.

In some embodiments, a method for providing unbalanced current control includes: receiving a first grid voltage measurement associated with a first electrical phase of a grid, a second grid voltage measurement associated with a second electrical phase of the grid, and a third grid voltage measurement associated with a third electrical phase of the grid; receiving a first current measurement associated with a first current of a first current controller, a second current measurement associated with a second current of a second current controller, and a third current measurement associated with a third current of a third current controller; determining whether the first current measurement, the second current measurement, and the third current measurement indicates that the first current, the second current, and the third current are balanced; in response to a determination that the first current, the second current, and the third current are balanced, determining a weight factor; receiving, from a voltage controller, a direct current voltage output measurement associated with a direct current link; determining a product of the direct current voltage output measurement, the weight factor, a first sine reference associated with the first grid voltage measurement, a second sine reference associated with the second grid voltage measurement, and a third sine reference associated with the third grid voltage measurement; generating a set of unbalanced current set points based on the product; and regulating the first current of the first current controller, the second current of the second current controller, and the third current of the third current controller using the set of unbalanced current set points.

In some embodiments, the method also includes determining a sum of the first current measurement, the second current measurement, and the third current measurement. In some embodiments, the method also includes providing the sum at a fourth current controller. In some embodiments, the method also includes generating a duty cycle based on outputs of the first current controller, the second current controller, the third current controller, and the fourth current controller. In some embodiments, the method also includes applying the duty cycle to the voltage controller. In some embodiments, the method also includes applying a feedforward gain to the first current controller, the second current controller, and the third current controller. In some embodiments, the voltage controller is associated with vehicle battery charger.

In some embodiments, an apparatus for providing unbalanced current control includes a controller configured to: determine whether a first current measurement associated with a first current of a first current controller, a second current measurement associated with a second current of a second current controller, and a third current measurement associated with a third current of a third current controller are balanced; in response to a determination that the first current, the second current, and the third current are balanced, determine a weight factor; determine a product of a direct current voltage output measurement associated with a direct current link, the weight factor, a first sine reference associated with a first grid voltage measurement associated with a first electrical phase of a grid, a second sine reference associated with a second grid voltage measurement associated with a second electrical phase of the grid, and a third sine reference associated with a third grid voltage measurement associated with a third electrical phase of the grid; generate a set of unbalanced current set points based on the product; and regulate the first current of the first current controller, the second current of the second current controller, and the third current of the third current controller using the set of unbalanced current set points.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A system for providing unbalanced current control, the system comprising:
   a processor; and
   a memory including instructions that, when executed by the processor, cause the processor to:

receive a first grid voltage measurement associated with a first electrical phase of a grid, a second grid voltage measurement associated with a second electrical phase of the grid, and a third grid voltage measurement associated with a third electrical phase of the grid;
   receive a first current measurement associated with a first current of a first current controller, a second current measurement associated with a second current of a second current controller, and a third current measurement associated with a third current of a third current controller;
   determine whether the first current measurement, the second current measurement, and the third current measurement indicates that the first current, the second current, and the third current are balanced;
   in response to a determination that the first current, the second current, and the third current are balanced, determine a weight factor;
   receive, from a voltage controller, a direct current voltage output measurement associated with a direct current link;
   determine a product of the direct current voltage output measurement, the weight factor, a first sine reference associated with the first grid voltage measurement, a second sine reference associated with the second grid voltage measurement, and a third sine reference associated with the third grid voltage measurement;
   generate a set of unbalanced current set points based on the product; and
   regulate the first current of the first current controller, the second current of the second current controller, and the third current of the third current controller using the set of unbalanced current set points.

2. The system of claim 1, wherein the instructions further cause the processor to determine a sum of the first current measurement, the second current measurement, and the third current measurement.

3. The system of claim 2, wherein the instructions further cause the processor to provide the sum at a fourth current controller.

4. The system of claim 3, wherein the instructions further cause the processor to generate a duty cycle based on outputs of the first current controller, the second current controller, the third current controller, and the fourth current controller.

5. The system of claim 4, wherein the instructions further cause the processor to apply the duty cycle to the voltage controller.

6. The system of claim 1, wherein the instructions further cause the processor to apply a feedforward gain to the first current controller, the second current controller, and the third current controller.

7. The system of claim 1, wherein the voltage controller is associated with vehicle battery charger.

8. The system of claim 1, wherein the weight factor includes an array of values.

9. The system of claim 8, wherein the array of values includes a first value corresponding to the first current controller, a second value corresponding to the second current controller, and a third value corresponding to the third current controller.

10. The system of claim 1, wherein the first sine reference, the second sine reference, and the third sine reference are generated by a phase-locked loop circuit.

11. The system of claim 10, wherein the phase-locked loop circuit generates the first sine reference, the second sine reference, and the third sine reference based on the first grid voltage measurement, the second grid voltage measurement, and the third grid voltage measurement.

12. The system of claim 1, wherein the voltage controller regulates a direct current voltage output associated with the direct current voltage output measurement using a predetermined voltage set point.

13. A method for providing unbalanced current control, the method comprising:

receiving a first grid voltage measurement associated with a first electrical phase of a grid, a second grid voltage measurement associated with a second electrical phase of the grid, and a third grid voltage measurement associated with a third electrical phase of the grid;

receiving a first current measurement associated with a first current of a first current controller, a second current measurement associated with a second current of a second current controller, and a third current measurement associated with a third current of a third current controller;

determining whether the first current measurement, the second current measurement, and the third current measurement indicates that the first current, the second current, and the third current are balanced;

in response to a determination that the first current, the second current, and the third current are balanced, determining a weight factor;

receiving, from a voltage controller, a direct current voltage output measurement associated with a direct current link;

determining a product of the direct current voltage output measurement, the weight factor, a first sine reference associated with the first grid voltage measurement, a second sine reference associated with the second grid voltage measurement, and a third sine reference associated with the third grid voltage measurement;

generating a set of unbalanced current set points based on the product; and regulating the first current of the first current controller, the second current of the second current controller, and the third current of the third current controller using the set of unbalanced current set points.

14. The method of claim 13, further comprising determining a sum of the first current measurement, the second current measurement, and the third current measurement.

15. The method of claim 14, further comprising providing the sum at a fourth current controller.

16. The method of claim 15, further comprising generating a duty cycle based on outputs of the first current controller, the second current controller, the third current controller, and the fourth current controller.

17. The method of claim 16, further comprising applying the duty cycle to the voltage controller.

18. The method of claim 13, further comprising applying a feedforward gain to the first current controller, the second current controller, and the third current controller.

19. The method of claim 13, wherein the voltage controller is associated with vehicle battery charger.

20. An apparatus for providing unbalanced current control, the apparatus comprising:

a controller configured to:

determine whether a first current measurement associated with a first current of a first current controller, a second current measurement associated with a second current of a second current controller, and a third current measurement associated with a third current of a third current controller are balanced;

in response to a determination that the first current, the second current, and the third current are balanced, determine a weight factor;

determine a product of a direct current voltage output measurement associated with a direct current link, the weight factor, a first sine reference associated with a first grid voltage measurement associated with a first electrical phase of a grid, a second sine reference associated with a second grid voltage measurement associated with a second electrical phase of the grid, and a third sine reference associated with a third grid voltage measurement associated with a third electrical phase of the grid;

generate a set of unbalanced current set points based on the product; and regulate the first current of the first current controller, the second current of the second current controller, and the third current of the third current controller using the set of unbalanced current set points.

* * * * *